(12) United States Patent
Evans

(10) Patent No.: US 9,481,405 B2
(45) Date of Patent: *Nov. 1, 2016

(54) SURFACE FLOW ENHANCEMENT DEVICE AND METHOD OF USING THE SAME ON A VEHICLE

(71) Applicant: Robert B. Evans, Santa Barbara, CA (US)

(72) Inventor: Robert B. Evans, Santa Barbara, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/478,141

(22) Filed: Sep. 5, 2014

(65) Prior Publication Data

US 2014/0375079 A1 Dec. 25, 2014

Related U.S. Application Data

(63) Continuation of application No. 13/083,505, filed on Apr. 8, 2011, now Pat. No. 8,852,710.

(51) Int. Cl.
*B62D 35/00* (2006.01)
*F15D 1/12* (2006.01)
*F15D 1/00* (2006.01)
*B63B 1/32* (2006.01)

(52) U.S. Cl.
CPC ............ *B62D 35/00* (2013.01); *F15D 1/003* (2013.01); *F15D 1/12* (2013.01); *B63B 1/32* (2013.01); *B63B 2231/30* (2013.01); *B64C 2230/26* (2013.01); *Y02T 50/166* (2013.01); *Y02T 70/12* (2013.01); *Y10T 29/49817* (2015.01); *Y10T 137/6881* (2015.04); *Y10T 137/6906* (2015.04); *Y10T 428/24008* (2015.01)

(58) Field of Classification Search
CPC ....... B62D 35/00; Y02T 70/12; F16D 1/003; F16D 1/12; F16D 2231/30
USPC .......................................................... 428/99
See application file for complete search history.

(56) References Cited

U.S. PATENT DOCUMENTS

| 2,338,199 A | 1/1944 | Parke |
| 2,764,373 A | 9/1956 | Anderson et al. |
| 3,186,753 A | 6/1965 | Steffanoff |
| 4,043,587 A | 8/1977 | Giallourakis et al. |
| 4,511,170 A | 4/1985 | Sankrithi |
| 4,696,442 A | 9/1987 | Mazzitelli |
| 4,706,910 A | 11/1987 | Walsh et al. |

(Continued)

FOREIGN PATENT DOCUMENTS

| DE | 4026518 A1 | 3/1991 |
| EP | 1506910 A1 | 2/2005 |

(Continued)

OTHER PUBLICATIONS

U.S. Appl. No. 13/083,505, filed Apr. 8, 2011

(Continued)

*Primary Examiner* — Alexander Thomas
(74) *Attorney, Agent, or Firm* — Leydig, Voit & Mayer, Ltd.

(57) ABSTRACT

A detachable surface flow enhancement device is provided, comprising: an aerodynamic structure configured to deflect moving air incident upon the aerodynamic structure; and an attaching element configured to attach the aerodynamic structure to a surface of a vehicle and to detach the aerodynamic structure from the surface of the vehicle without altering the surface of the vehicle.

20 Claims, 11 Drawing Sheets

(56) References Cited

U.S. PATENT DOCUMENTS

| | | |
|---|---|---|
| 5,018,779 A | 5/1991 | Lund |
| 5,058,837 A | 10/1991 | Wheeler |
| 5,074,234 A | 12/1991 | Stearns, IV |
| 5,253,828 A | 10/1993 | Cox |
| 5,417,599 A | 5/1995 | Evans |
| 5,527,197 A | 6/1996 | Evans |
| 6,276,636 B1 | 8/2001 | Krastel |
| 6,702,364 B2 | 3/2004 | Neel |
| 6,837,465 B2 | 1/2005 | Lisy et al. |
| 6,959,958 B2 | 11/2005 | Basford |
| 7,255,387 B2 | 8/2007 | Wood |
| 7,275,722 B2 | 10/2007 | Irving et al. |
| 7,347,485 B1 | 3/2008 | Saunders |
| 2002/0041111 A1 | 4/2002 | Schmitt |
| 2007/0018056 A1 | 1/2007 | Narramore |
| 2008/0203233 A1 | 8/2008 | Schmidt |
| 2008/0217485 A1 | 9/2008 | Ikeda |

FOREIGN PATENT DOCUMENTS

| | | |
|---|---|---|
| EP | 1632423 A1 | 3/2006 |
| KR | 20-2010-0005303 U | 5/2010 |
| KR | 10-2011-0021032 A | 3/2011 |

OTHER PUBLICATIONS

"Wavegrinder Surfboard Fins-FAQs" Wavegrinder http://www.wavegrinder.com/faqs.htm, Also see http://www.wavegrinder.com/images/Car%20winglet.jpg (Accessed Dec. 15, 2010).

"BMW Sauber F1.08-cockpit winglets" Formula 1, http://www.formula1.com/news/technical/2008/796/563.html (Accessed Dec. 15, 2010).

SURFACE FLOW ENHANCEMENT DEVICE AND METHOD OF USING THE SAME ON A VEHICLE

This application is a continuation of U.S. patent application Ser. No. 13/083,505, filed Apr. 8, 2011, now U.S. Pat. No. 8,852,710, which is incorporated by reference in its entirety.

FIELD OF THE INVENTION

The present claimed invention relates in general to increasing fluid flow as it moves across moving vehicles. More specifically it relates to surface flow enhancement devices that can be placed upon the surfaces of vehicles to enhance the circulation of the fluid across the surface area by increasing its flow rate to reduce frictional resistance, vortices or drag, eliminating the vacuum at the trailing edge.

BACKGROUND OF THE INVENTION

All vehicles pass through a fluid environment as they move. For example, cars and airplanes move through air, boats move through air and water, and submarines move through water. As these vehicles move through their fluid environment, the fluid (e.g., air or water) is slowed down by the frictional resistance of the surface area of the body of the vehicle. This creates a layer of turbulent fluid flow that circulates along the vehicle slower than the fluid flow that is not in contact with the surface area of the vehicle. The varying speeds of fluid layers meet behind the vehicle, or any protuberances thereon, such as mirrors, wheel wells, rudders or propellers, as the vehicle moves through the fluid at differential rates so as to form a low pressure area, or vacuum immediately behind the vehicle, or its protuberances. The turbulent layer and vortices create a drag force, which opposes the motion of the vehicle through the fluid environment. In this way, the front, sides, top, bottom, and even rear of a vehicle can contribute to the drag that vehicle suffers while in transit through the fluid environment.

One aspect of the drag force caused by fluid resistance is that caused by trailing vortices that result from the vehicle moving through the fluid, the so-called turbulent flow. Depending upon the shape and form of the vehicle, a variety of vortices can be formed along all surfaces of the vehicle. These vortices in the fluid hold the vehicle back, increasing the energy needed to move the vehicle forward. Another aspect of the drag force caused by fluid resistance involves the frictional resistance of the fluid as it passes over the various surfaces of the vehicle.

As a result of this, the speed and efficiency of a vehicle moving through the fluid environment is limited not only by the drag forces created by turbulent flow, but also by drag forces caused by frictional fluid resistance to the surface of the vehicle, which depends on the amount of fluid traveling along and past the vehicle.

Furthermore, the amount of drag caused by these sources is directly related to the amount of fuel needed to move the vehicle. As a result, much effort is made to design aerodynamic or hydrodynamic vehicles that minimize the amount of drag on the vehicle.

Unfortunately, compromises must be made in vehicle design to accommodate other parameters than just fluid resistance. Engine design, passenger comfort, safety requirements, cargo space, and even aesthetics can mean that a vehicle's design creates many undesirable vortices as it passes through its fluid environment.

It would therefore be desirable to provide a device to control the flow of a fluid as it flows past the surface of a vehicle to retard the creation of vortices that create drag against the vehicle. It would be further desirable to make this device easily attachable or detachable so that it could be more effectively added to existing vehicles or added after market.

SUMMARY OF THE INVENTION

A detachable surface flow enhancement device is provided, comprising: an aerodynamic structure configured to deflect moving air incident upon the aerodynamic structure; and an attaching element configured to attach the aerodynamic structure to a surface of a vehicle and to detach the aerodynamic structure from the surface of the vehicle without altering the surface of the vehicle.

In some embodiments, the attaching element does not pass through the surface of the vehicle. In some embodiments, the attaching element does not employ an adhesive material to attach the aerodynamic structure to the surface of the vehicle. In some embodiments, the surface of the vehicle is a substantially smooth surface without perforations.

The aerodynamic structure has a teardrop shape. In some embodiments, the teardrop shape may have a length between 1 and 5 inches, and the teardrop shape may have a width between 0.5 and 2.5 inches.

The aerodynamic structure may also have one of a fin shape and an oval shape with a rear fin.

A surface flow enhancement device is provided, comprising: an aerodynamic portion having a teardrop shape; and an attachment portion having a substantially flat surface configured to attach to a surface of a vehicle, wherein the teardrop shape has a length between 1 and 5 inches, and wherein the teardrop shape has a width between 0.5 and 2.5 inches.

The aerodynamic portion may form a concavity. The attachment portion may be formed at least as a peripheral portion around a lip of the concavity. The aerodynamic portion may comprise a first material, and the attachment portion may comprise a second material softer than the first material. The first material comprises one of flexible polyurethane, flexible thermal plastic urethane, flexible silicone, or flexible polyvinylchloride, and the second material may comprise one of flexible urethane, flexible silicone, flexible polyvinylchloride.

An attachment element may be formed in the concavity and may be configured to attach to the surface of the vehicle. The attachment element may include a securing magnet configured to attach to the surface of the vehicle when the surface of the vehicle comprises a magnetic metal. The concavity formed by the aerodynamic surface may be surrounded by a substantially coplanar lip, and the attachment element may be configured not to rise to a level of the substantially coplanar lip. The securing magnet may be a rare-earth magnet.

A method of altering a position of a removable surface flow enhancement device on a vehicle surface is provided, comprising: attaching the removable surface flow enhancement device to the surface of the vehicle at a first position; removing the removable surface flow enhancement device from the surface of the vehicle without damaging the surface of the vehicle; moving the removable surface flow enhancement device to a second position on the surface of the vehicle; attaching the removable surface flow enhancement device to the surface of the vehicle at the second position.

The vehicle may be on one of: an automobile, a boat, a ship, a submarine, an airplane, or a helicopter. When the vehicle is an automobile, the first position may be one of on a roof of the car, on a front hood of the car, on a side door of the car, or on a back hood of the car. When the vehicle is a boat, the first position may be on the hull of the boat. When the vehicle is an airplane, the first position may be one of: the fuselage of the airplane, or the wing of the airplane.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Surface Flow Enhancement Device

Figure 1C:
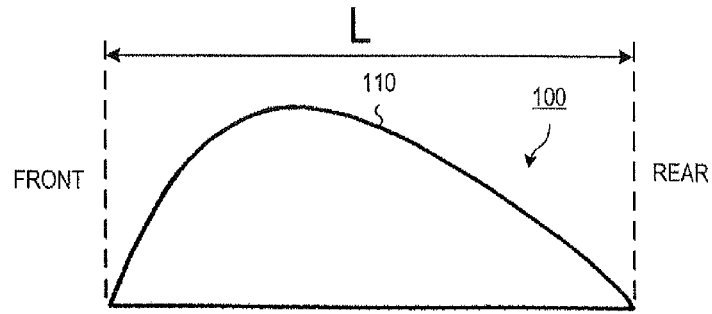
FIGS. 1A to 1E are diagrams of a surface flow enhancement device according to a disclosed embodiment.
Figure 1A:
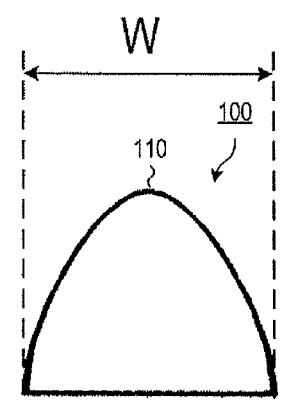
Figure 1D:
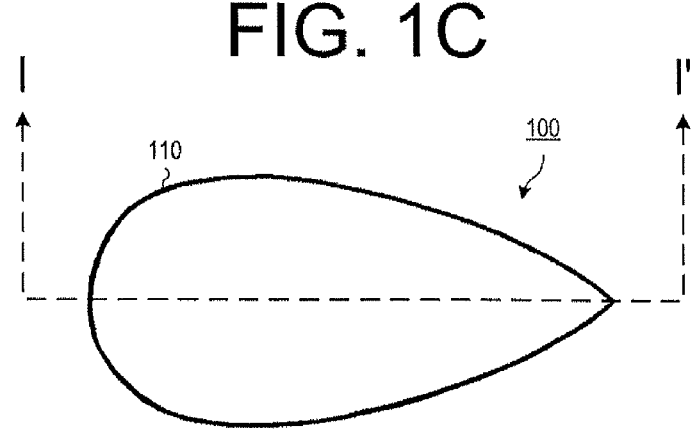
Figure 1B:
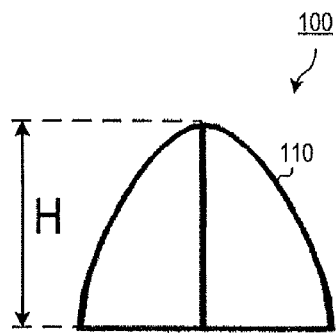
Figure 1E:
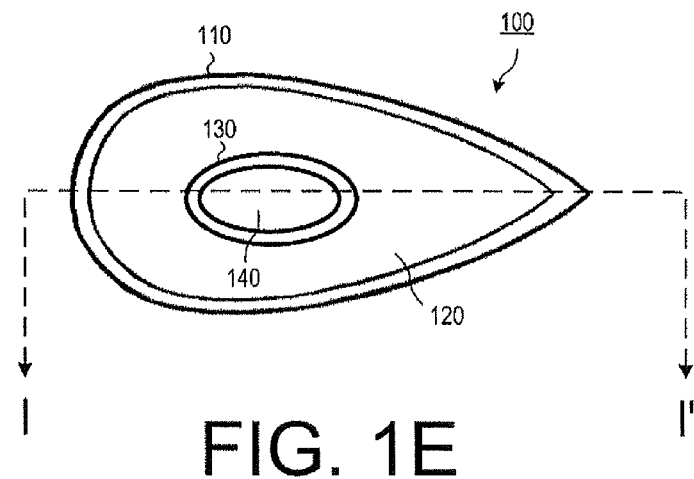

FIGS. 1A to 1E are diagrams of a surface flow enhancement device 100 according to a disclosed embodiment. FIG. 1A is a front view; FIG. 1B is a rear view; FIG. 1C is a left side view; FIG. 1D is a top view; and FIG. 1E is a bottom view.

As shown in FIGS. 1A to 1E, the surface flow enhancement device 100 has a generally half-teardrop shape, curved at a front end, pointed at a rear end, and flat on the bottom. The surface flow enhancement device 100 of this embodiment includes a main surface 110, a concavity 120, a protrusion 130, and a magnet 140.

The main surface 110 forms the half-teardrop shape with a flat bottom. This flat bottom allows it to be placed on a relatively flat surface of a vehicle and allows the main surface 110 to deflect fluid (e.g., air or water) moving past the surface of the vehicle.

In the disclosed embodiments, the length (L) of the surface flow enhancement device 100 is about 2.5 inches; the width (W) of the surface flow enhancement device 100 is about 1.2 inches; and the height (H) of the surface flow enhancement device 100 is about 1 inch. However, this is by way of example only. The length (L), width (W), and height (H) may vary depending upon the size of the body of the vehicle they are used on and the expected speed of the vehicles. For example, on a mid-sized automobile that will travel at speeds of between 40 and 80 miles per hour, the length (L) may vary between approximately 1 and 5 inches; the width (W) may vary between approximately 0.5 and 2.5 inches; and the height (H) may vary between approximately 0.5 and 2 inches.

In more general terms, the shape of the main surface should be chosen such that it is proportionally wider at the front end than at the trailing end, and that its overall surface area is approximately twice that of its footprint.

In the disclosed embodiments, the main surface 110 is made out of polyurethane. However, in alternate embodiments any similar tough, flexible material can be used. In other alternate embodiments a fixed material, such as metal or hard plastic can be used.

The concavity 120 is a hollow area formed inside of the main surface 110, and serves to make the surface flow enhancement device 100 both lighter and cheaper to manufacture. In the disclosed embodiments, it also allows the main surface to deform slightly as the surface flow enhancement device 100 is affixed to the surface of a vehicle, expelling some of the air from the concavity 120, and creating a low-pressure seal with the surface of the vehicle.

The protrusion 130 extends from the main surface 110 into the concavity 120 and forms a holder for the magnet 140. In this embodiment, the protrusion extends toward, but not quite reaching, the flat end of the main surface.

The magnet 140 is contained securely in the protrusion 130, and is provided to attach securely to the surface of the vehicle when the surface is a magnetic metal. In the disclosed embodiments, the magnet 140 is a rare-earth magnet, though alternate embodiments could use other types of magnets. In addition, although only one magnet 140 is provided in this embodiment, alternate embodiments could employ two or more magnets 140, each secured by the same or a different protrusion 130. Furthermore, although one or more magnets 140 are shown as an affixing element in the disclosed embodiments, alternate elements for affixing the surface flow enhancement device 100 to the surface of a vehicle can be employed.

Figure 2:
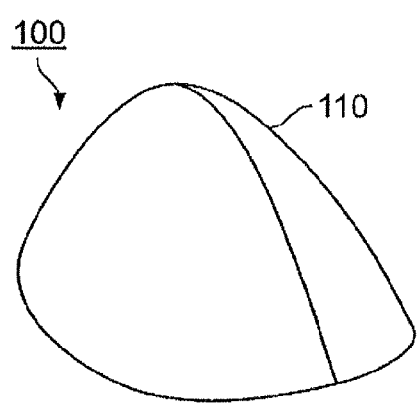
FIG. 2 is a perspective view of the surface flow enhancement device of FIGS. 1A to 1E from above.
Figure 3:
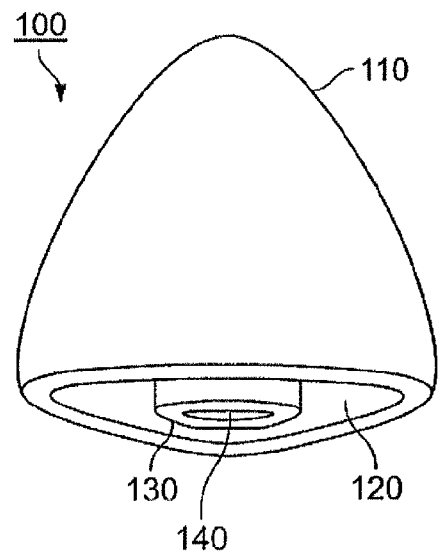
FIG. 3 is perspective view of the surface flow enhancement device of FIGS. 1A to 1E from below.

FIG. 2 is a perspective view of the surface flow enhancement device 100 of FIGS. 1A to 1E from above, while FIG. 3 is perspective view of the surface flow enhancement device 100 of FIGS. 1A to 1E from below. Taken in conjunction with FIGS. 1A to 1E, FIGS. 2 and 3 show further details of the shape of the main surface 110 of the surface flow enhancement device 100, and the arrangement of the protrusion 130 and the magnet 140 within the concavity 120 formed by the main surface 110.

Figure 4A:
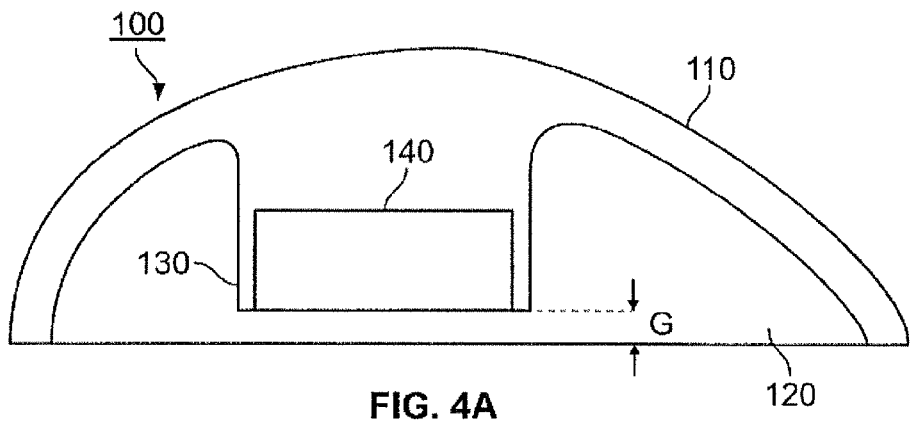
FIG. 4A is a cross-section of the surface flow enhancement device of FIGS. 1A to 1E along line I-I from FIGS. 1D and 1E according to a disclosed embodiment.

FIG. 4A is a cross-section of the surface flow enhancement device 100 of FIGS. 1A to 1E along line I-I from FIGS. 1D and 1E. As shown in FIG. 4A, in this embodiment, the protrusion 130 and the magnet 140 are formed within the concavity 120 such that the magnet 140 is substantially coplanar with the bottom surface of the main surface 110, but is recessed in the concavity 120 by a gap (G). Because of this, when the surface flow enhancement device 100 of FIG. 4 is placed on a magnetic metal surface of a vehicle in an above-water environment (i.e., in air, not in water), the magnet 140 will pull the main surface 110 down slightly as it makes contact with the surface of a vehicle, slightly deforming the main surface 110, and expelling air from the concavity 120. This will make the pressure in the concavity 120 slightly lower than the outside pressure, creating a low-pressure seal that will increase the holding power of the surface flow enhancement device 100 onto the surface of the vehicle, beyond that provided by the magnet alone.

In addition, by employing this structure to affix the surface flow enhancement device 100 to the surface of a vehicle, the surface flow enhancement device 100 can be made more secure during normal operation of the vehicle, but also more easily removable when desired.

Figure 4B:
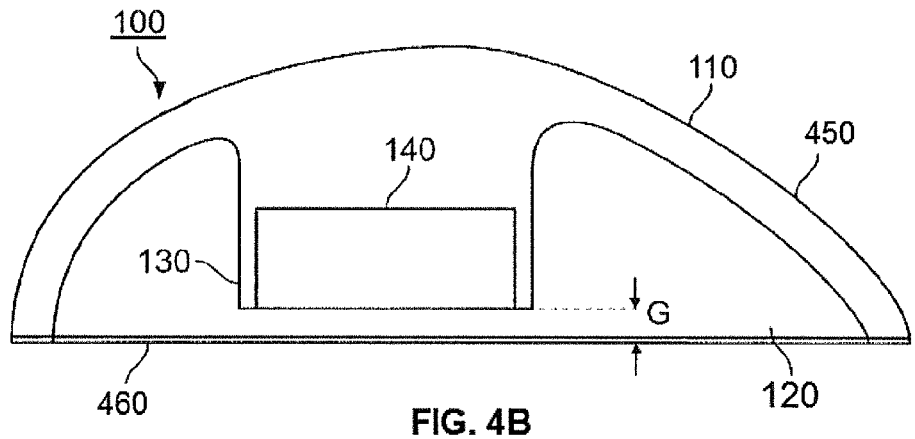
FIG. 4B is a cross-section of the surface flow enhancement device of FIGS. 1A to 1E along line I-I from FIGS. 1D and 1E according to an alternate embodiment.

FIG. 4B is a cross-section of an alternate embodiment of the surface flow enhancement device 100 of FIGS. 1A to 1E along line I-I from FIGS. 1D and 1E. As shown in FIG. 4B, this embodiment is similar to the embodiment of FIG. 4A, except that the main surface 110 comprises an aerodynamic portion 450 and an attachment portion 460. The aerodynamic portion 450 is made of a material that is hard enough to withstand the pressure of fluid against it without deforming. In various embodiments aerodynamic portion 450 may be made of flexible polyurethane, flexible thermal plastic urethane, flexible silicone, or flexible polyvinylchloride, or any other suitable material. The attachment portion 460 is made of a material that can easily connect with the surface of a vehicle, simultaneously creating a seal and not damaging the vehicle's surface. In various embodiments attachment portion 460 may be made of flexible polyurethane, flexible thermal plastic urethane, flexible silicone, or flexible polyvinylchloride, or any other suitable material. The aerodynamic portion 450 may be made of the same material as the attachment portion 460, or a different material.

In some embodiments, the attachment portion 460 is formed to be softer than the aerodynamic portion 450 (i.e., having a durometer lower than the aerodynamic portion 450). The can be particularly advantageous when the surface of the vehicle on which the surface flow enhancement device 100 is to be used may be susceptible to scratching.

As described in the embodiments above, the surface flow enhancement device 100 is affixed to the surface of a vehicle by a combination of magnetism and a low-pressure seal between the concavity 120 and the surface of the vehicle. This combination of forces can provide a very secure attachment of the surface flow enhancement device 100 to the surface of the vehicle during normal operation. This secure attachment will be sufficient to allow the surface flow enhancement device 100 to resist being moved by the force of fluid pressing against it as the vehicle moves.

However, should a user desire to remove the surface flow enhancement device 100 (e.g., to relocate it, replace it, repair it, etc.), the user can deform the main body 110 by simple pressure between two fingers. This will break the seal between the concavity 120 and the surface of the vehicle, leaving only the magnetic affixing between the magnet 140 and the surface of the vehicle. The user can then simply pull the surface flow enhancement device 100 off of the surface of the vehicle.

Fluid flowing against the surface flow enhancement device 100 during normal operation of the vehicle will not provide the pinpoint pressure that a user's fingers can, and so will not distort the main body 110 or break the seal between the concavity 120 and the surface of the vehicle. As a result, during normal operation of the vehicle, the surface flow enhancement device 100 will remain affixed to the surface of the vehicle by both magnetic force and the low-pressure seal between the concavity 120 and the surface of the vehicle, and will be able to withstand a great deal of force exerted against it by fluid passing over the surface of the vehicle.

Figure 5:
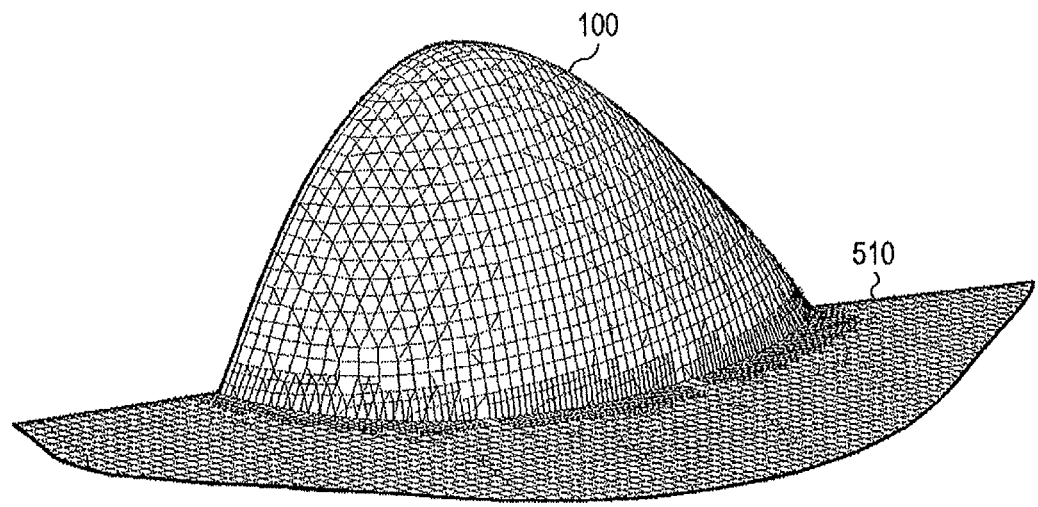
FIG. 5 is a perspective view of the surface flow enhancement device of FIGS. 1A to 1E from above and affixed to a surface of a vehicle.

FIG. 5 is a perspective view of the surface flow enhancement device 100 of FIGS. 1A to 1E from above and affixed to a surface of a vehicle. As shown by FIG. 5, the surface flow enhancement device 100 is affixed to the surface 510 of a vehicle such that the flat side of the main surface 110 is pressed against the surface of the vehicle.

Figure 6:
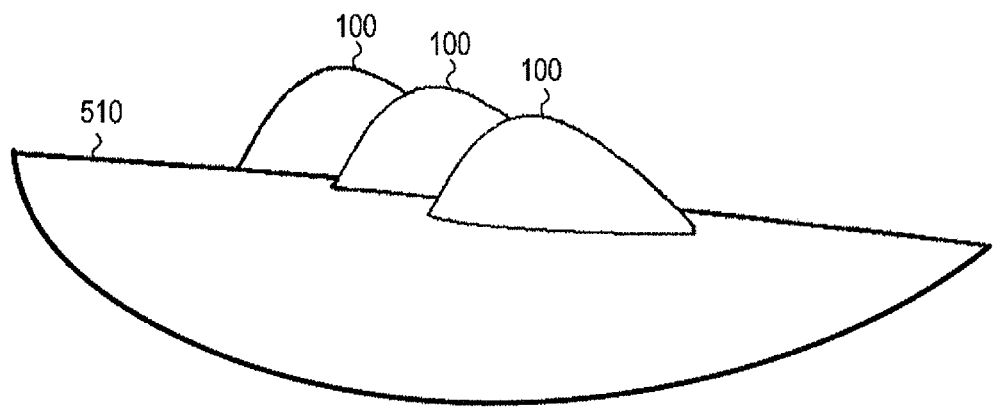
FIG. 6 is a perspective view of multiple copies of the surface flow enhancement device of FIGS. 1A to 1E from above and affixed to a surface of a vehicle.

FIG. 6 is a perspective view of multiple copies of the surface flow enhancement device 100 of FIGS. 1A to 1E from above and affixed to a surface 510 of a vehicle. As shown by FIG. 6, more than one surface flow enhancement device 100 can be used in an array to increase their efficiency. FIG. 6 shows the surface flow enhancement devices 100 placed in a linear array. However, alternate embodiments could place them in any sort of regular or irregular array as desired to reduce the formation of vortices.

Alternate Surface Flow Enhancement Device Shapes

Although a single surface flow enhancement device 100 is described above, this is only by way of example. Alternate shapes can be used for the surface flow enhancement device 100 in other embodiments. FIGS. 7A to 7E and FIGS. 8A to 8E show two exemplary alternate embodiments. However other shapes can be used in alternate embodiments that serve to align circulation and retard the formation of vortices.

Figure 7A:
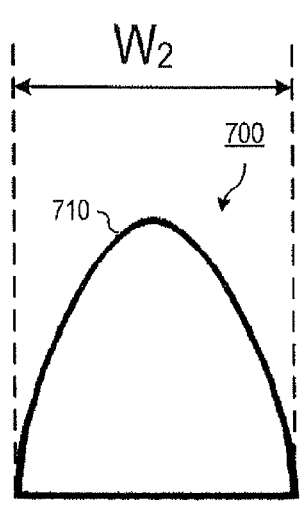
FIGS. 7A to 7E are diagrams of a surface flow enhancement device according to another disclosed embodiment.
Figure 7C:
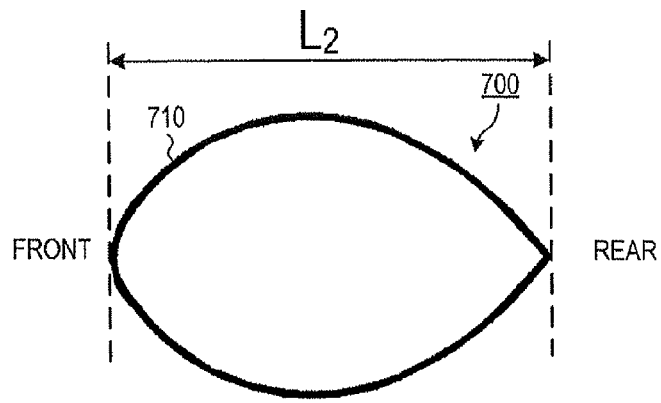
Figure 7B:
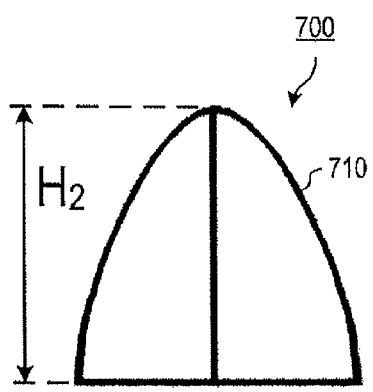
Figure 7D:
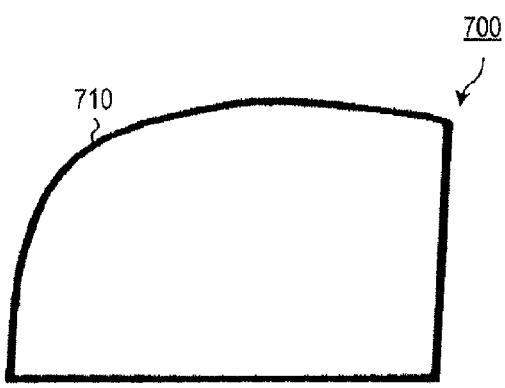
Figure 7E:
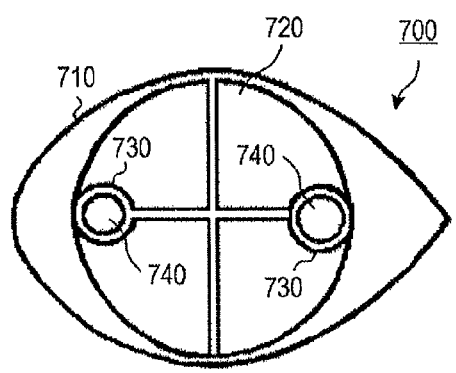

FIGS. 7A to 7E are diagrams of a surface flow enhancement device 700 according to another disclosed embodiment. FIG. 7A is a front view; FIG. 7B is a rear view; FIG. 7C is a left side view; FIG. 7E is a top view; and FIG. 7E is a bottom view.

As shown in FIGS. 7A to 7E, the surface flow enhancement device 700 is generally fin-shaped, with a curved front, a pointed rear, and a flat bottom. The surface flow enhancement device 700 of this embodiment includes a main surface 710, a concavity 720, a protrusion 730, and two magnets 740.

The main surface 710 forms the fin shape with a flat bottom. This flat bottom allows it to be placed on a relatively flat surface of a vehicle and allows the main surface 710 to deflect fluid (e.g., air or water) moving past the surface of the vehicle.

In the disclosed embodiments, the length ($L_2$) of the surface flow enhancement device 700 is about 2.5 inches; the width ($W_2$) of the surface flow enhancement device 700 is about 1.75 inches; and the height ($H_2$) of the surface flow enhancement device 100 is about 1.75 inches. However, this is by way of example only. As noted above, the length (L), width (W), and height (H) may vary depending upon the size of the body of the vehicle they are used on and the expected speed of the vehicles. For example, on a mid-sized automobile that will travel at speeds of between 40 and 80 miles per hour, the length (L) may vary between approximately 1 and 5 inches; the width ($W_2$) may vary between approximately 0.75 and 3.5 inches; and the height (H) may vary between approximately 0.75 and 3.5 inches.

The concavity 720 is a hollow area formed inside of the main surface 710, and serves to make the surface flow enhancement device 700 both lighter and cheaper to manufacture. In the disclosed embodiments, it also allows the main surface to deform slightly as the surface flow enhancement device 700 is affixed to the surface of a vehicle, expelling some of the air from the concavity 720, and creating a low-pressure seal with the surface of the vehicle.

The protrusion 730 extends from the main surface 710 into the concavity 720 and forms a holder for the magnets 740. In this embodiment, the protrusion extends toward, but not quite reaching, the flat end of the main surface.

The magnets 740 are contained securely in the protrusion 730, and are provided to attach securely to the surface of the vehicle when the surface is a magnetic metal. In the disclosed embodiments, the magnets 740 are rare-earth magnets, though alternate embodiments could use other types of magnets. In addition, although two magnets 740 are provided in this embodiment, alternate embodiments could employ one magnet 740 or three or more magnets 740, each secured by the same or a different protrusion 730. Furthermore, although one or more magnets 740 are shown as an affixing element in the disclosed embodiments, alternate elements for affixing the surface flow enhancement device 100 to the surface of a vehicle can be employed.

Figures 8A, 8B, 8C, 8D, 8E:
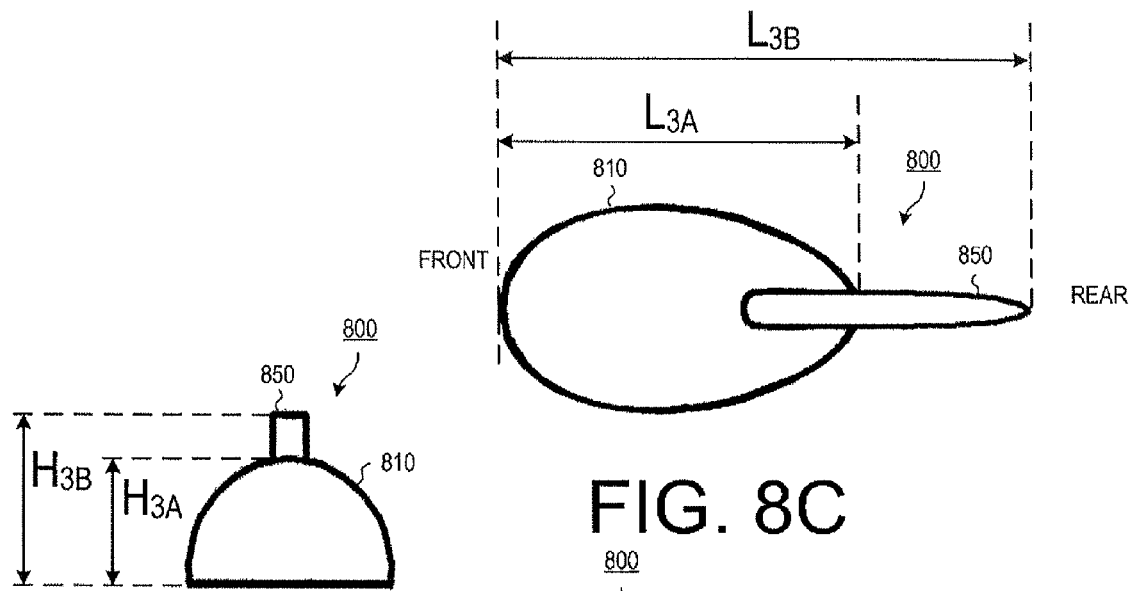
FIGS. 8A to 8E are diagrams of a surface flow enhancement device according to another disclosed embodiment.

FIGS. 8A to 8E are diagrams of a surface flow enhancement device 800 according to another disclosed embodiment. FIG. 8A is a front view; FIG. 8B is a rear view; FIG. 8C is a left side view; FIG. 8D is a top view; and FIG. 8E is a bottom view.

As shown in FIGS. 8A to 8E, the surface flow enhancement device 800 is generally oval, with a back fin, and a flat bottom. The surface flow enhancement device 800 of this embodiment includes a main surface 810, a concavity 820, a protrusion 830, two magnets 840, and a fin 850.

The main surface 810 forms the oval shape and fin with a flat bottom. This flat bottom allows it to be placed on a relatively flat surface of a vehicle and allows the main surface 810 to deflect fluid (e.g., air or water) moving past the surface of the vehicle.

The concavity 820 is a hollow area formed inside of the main surface 810, and serves to make the surface flow enhancement device 800 both lighter and cheaper to manufacture. In the disclosed embodiments, it also allows the main surface to deform slightly as the surface flow enhancement device 800 is affixed to the surface of a vehicle, expelling some of the air from the concavity 820, and creating a low-pressure seal with the surface of the vehicle.

The protrusion 830 extends from the main surface 810 into the concavity 820 and forms a holder for the magnets 840. In this embodiment, the protrusion extends toward, but not quite reaching, the flat end of the main surface.

The magnets 840 are contained securely in the protrusion 830, and are provided to attach securely to the surface of the vehicle when the surface is a magnetic metal. In the disclosed embodiments, the magnets 840 are rare-earth magnets, though alternate embodiments could use other types of magnets. In addition, although two magnets 840 are provided in this embodiment, alternate embodiments could employ one magnet 840 or three or more magnets 840, each secured by the same or a different protrusion 830. Furthermore, although one or more magnets 840 are shown as an affixing element in the disclosed embodiments, alternate elements for affixing the surface flow enhancement device 100 to the surface of a vehicle can be employed.

The fin 850 is attached to the rear of the main body 810 and is both thinner and higher than the main body 810.

In the disclosed embodiments, the length ($L_{3B}$) of the surface flow enhancement device 800 including the main body 810 and the fin 850 is about 2.5 inches, while the length ($L_{3A}$) of the main body 810 alone is about 1.65 inches. The width ($W_{3A}$) of the main body 810 is about 1 inch, while the width ($W_{3B}$) of the fin 850 is about 0.2 inches. The height ($H_{3A}$) of the main body 810 is about 0.5 inches, while the height ($H_{3B}$) of the fin 850 is about 0.75 inches. However, this is by way of example only. As noted above, the length (L), width (W), and height (H) may vary depending upon the size of the body of the vehicle they are used on and the expected speed of the vehicles. For example, on a mid-sized automobile that will travel at speeds of between 40 and 80 miles per hour, the length ($L_{3A}$) may vary between approximately 0.8 and 3 inches; the length ($L_{3B}$) may vary between approximately 1.25 and 5 inches; the width ($W_{3A}$) may vary between approximately 0.5 and 2 inches; the width ($W_{3B}$) may vary between approximately 0.1 and 0.4 inches; the width ($H_{3A}$) may vary between approximately −0.25 and 1 inches; and the height ($H_{3B}$) may vary between approximately 0.3 and 1.5 inches.

Placement and Operation of Surface Flow Enhancement Devices

As noted above, the surface flow enhancement devices 100, 700, 800 can be placed on the surfaces of vehicles to divert the flow of fluid (e.g., air or water) around the surface of the device and increase the circulation of the fluid around the vehicle when it is moving and prevent the friction resistance that can increase the drag that the vehicle suffers as it moves.

Figure 9:
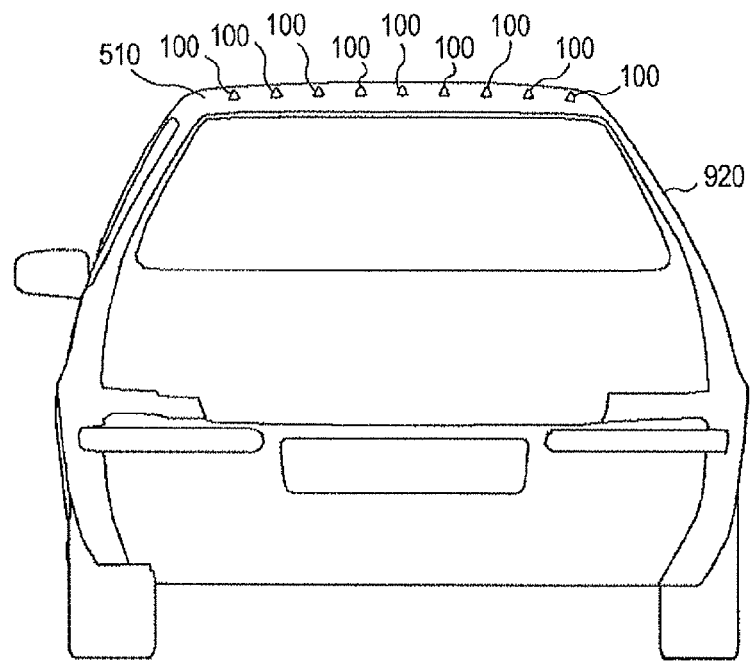
FIG. 9 is a rear view of a vehicle showing a placement of an array of the surface flow enhancement device of FIGS. 1A to 1E on a top of the vehicle, according to a disclosed embodiment.
Figure 10:
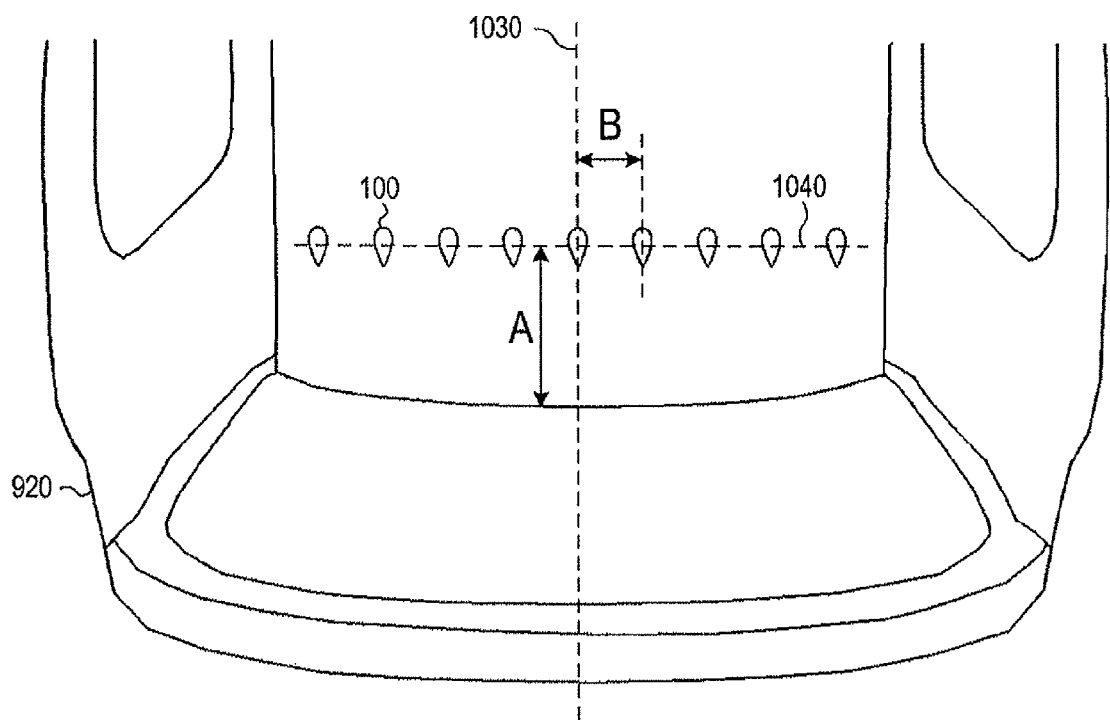
FIG. 10 is an overhead view of a vehicle showing a placement of an array of the surface flow enhancement device of FIGS. 1A to 1E on a top of the vehicle, according to a disclosed embodiment.

FIGS. 9 and 10 show the placement of multiple surface flow enhancement devices 100 on the roof of a car, by way of example. FIGS. 11 to 15 then show how the presence of these surface flow enhancement devices 100 influences the flow of air past the car.

FIG. 9 is a rear view of a vehicle showing a placement of an array of the surface flow enhancement device 100 of FIGS. 1A to 1E on a roof 510 of the vehicle 920, according to a disclosed embodiment, while FIG. 10 is an overhead view of a vehicle 920 showing a placement of an array of the surface flow enhancement device 100 of FIGS. 1A to 1E on a roof 510 of the vehicle 920, according to a disclosed embodiment.

As shown in FIGS. 9 and 10, multiple surface flow enhancement devices 100 are placed on the roof 510 of a vehicle 920. In this embodiment, they are placed in a line 1040 that is formed a distance A from the rear of the roof 510. One of the surface flow enhancement devices 100 is placed along a centerline 1030 of the roof 510, and the others are placed a distance B from the others along the line 1040. In this embodiment A is set to be about 7.5 inches, and B is set to be about 2.5 inches. However, this is by way of example only. In other embodiments the placement of the surface flow enhancement devices 100 can vary dramatically.

In normal operation, without the surface flow enhancement devices 100, air would flow over the roof 510 of the vehicle 920, forming vortices behind the vehicle 920 as it moved forward, and these vortices would increase the drag suffered by the vehicle 920. However, as shown in FIGS. 11 to 15, the inclusion of the surface flow enhancement devices 100 on the roof 510 of the vehicle 920 significantly reduces the formation of these vortices.

Figure 11:
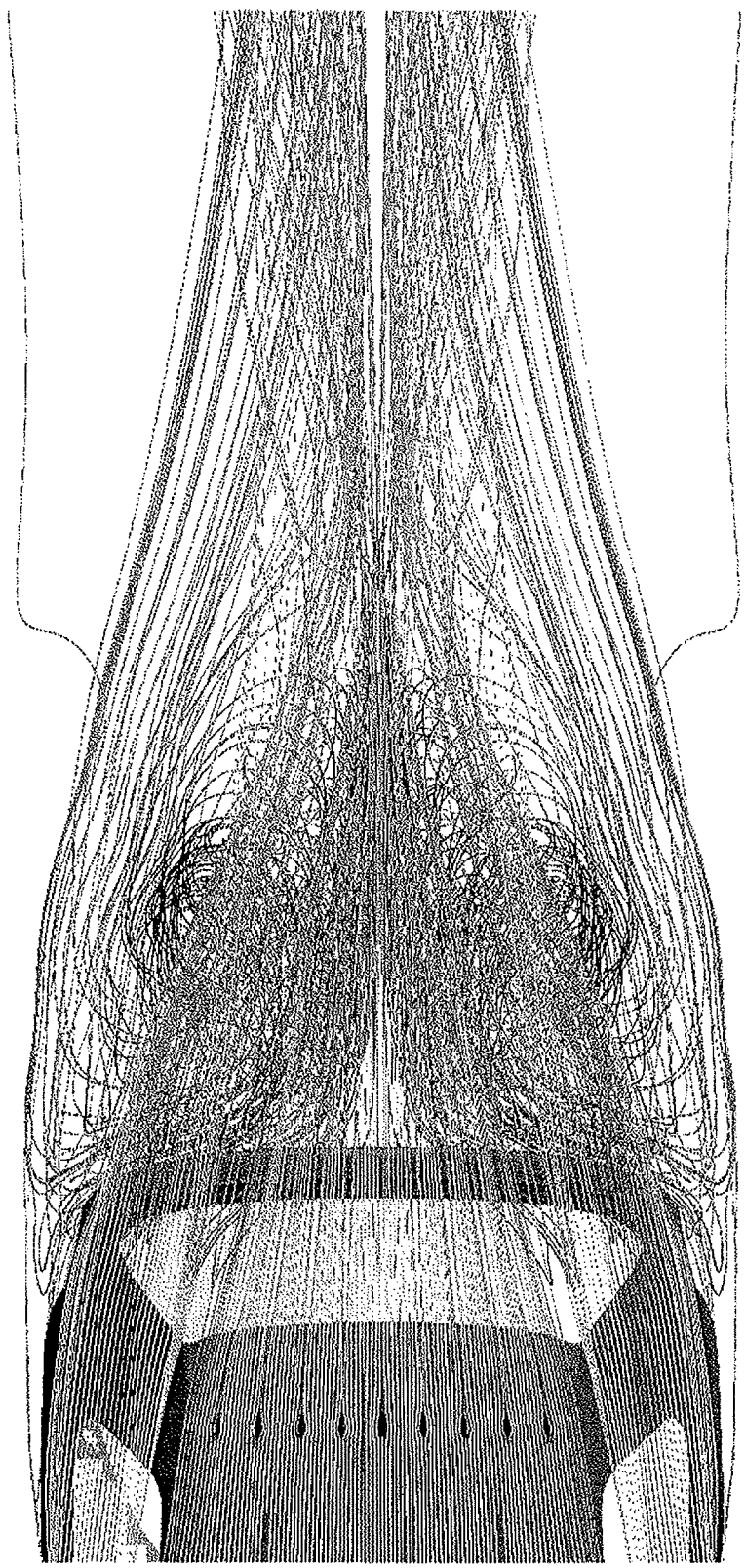
FIG. 11 is a diagram showing air flow from above of a vehicle using an array of the surface flow enhancement device of FIGS. 1A to 1E, according to a disclosed embodiment.
Figure 12:
FIG. 12 is a diagram showing air flow from the right and rear of a vehicle using an array of the surface flow enhancement device of FIGS. 1A to 1E, according to a disclosed embodiment.
Figure 13:
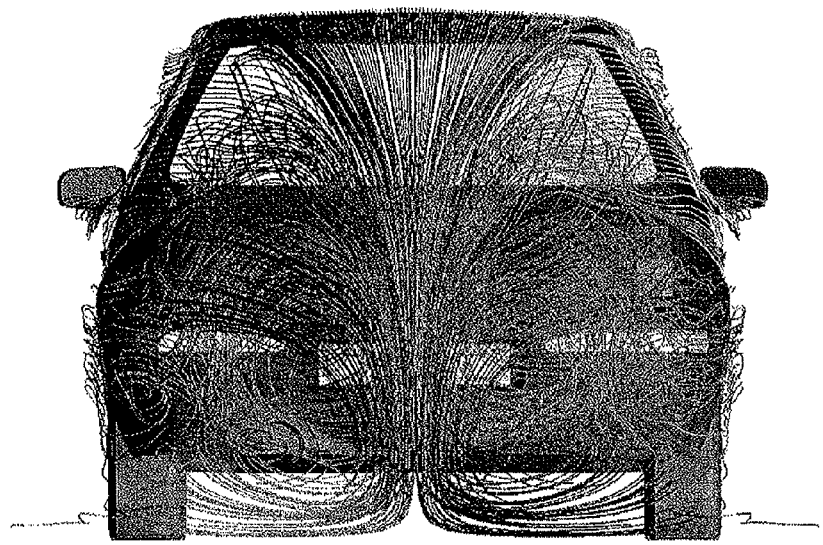
FIG. 13 is a diagram showing air flow from the rear of a vehicle using an array of the surface flow enhancement device of FIGS. 1A to 1E, according to a disclosed embodiment.

FIG. 11 is a diagram showing air flow from above of a vehicle using an array of the surface flow enhancement device of FIGS. 1A to 1E, according to a disclosed embodiment; FIG. 12 is a diagram showing air flow from the right and rear of a vehicle using an array of the surface flow enhancement device of FIGS. 1A to 1E, according to a disclosed embodiment; and FIG. 13 is a diagram showing air flow from the rear of a vehicle using an array of the surface flow enhancement device of FIGS. 1A to 1E, according to a disclosed embodiment. As shown in FIGS. 11 to 13, the surface flow enhancement devices 100 break up the flow of the air as it passes over the roof 510 of the vehicle, inhibiting the formation of vortices behind the car.

Figure 14:
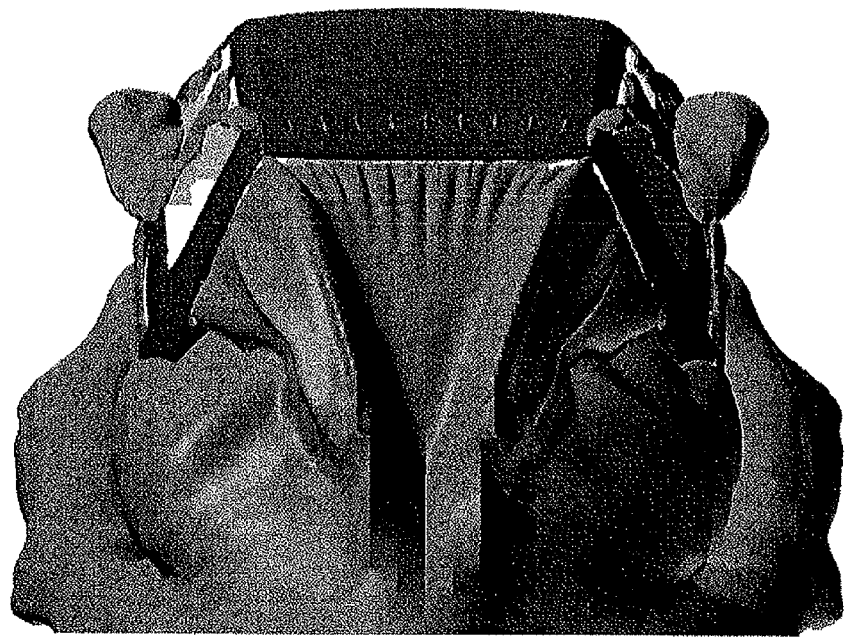
FIG. 14 is a diagram showing isoturbulence from the right and rear of a vehicle using an array of the surface flow enhancement device of FIGS. 1A to 1E, according to a disclosed embodiment.
Figure 15:
FIG. 15 is a diagram showing isoturbulence from the rear of a vehicle using an array of the surface flow enhancement device of FIGS. 1A to 1E, according to a disclosed embodiment.

Similarly, FIG. 14 is a diagram showing isoturbulence from the right and rear of a vehicle using an array of the surface flow enhancement device of FIGS. 1A to 1E, according to a disclosed embodiment; and FIG. 15 is a diagram showing isoturbulence from the rear of a vehicle using an array of the surface flow enhancement device of FIGS. 1A to 1E, according to a disclosed embodiment. As shown in FIGS. 14 and 15, the surface flow enhancement devices 100 break up the flow of the air as it passes over the roof 510 of the vehicle, reducing the amount of isoturbulence behind the car.

As shown in FIGS. 11 to 15, the presence of the surface flow enhancement devices 100 on the roof 510 of the vehicle 920 reduces both the presence of vortices and the isoturbulence behind the vehicle 920. This reduces the drag on the vehicle 920, and so the amount of energy required to move it forward. As a result, this also increases the fuel efficiency of the vehicle 920.

Furthermore, although FIGS. 9 to 15 show an embodiment in which several surface flow enhancement devices 100 are placed on the back of a roof 510 of a vehicle 920, the placement of one or more surface flow enhancement devices 100 on other surfaces of the vehicle 920, or any other vehicle that passes through a fluid atmosphere (e.g., air or water). For example, surface flow enhancement devices 100 could be placed on the front hood, on the back hood, on the sides, or even the bottom of a car; they could be placed on the hull of a ship, they could be placed on the fuselage or wings of an airplane, etc. Any vehicle that passes through a fluid atmosphere can benefit from the attachment of one or more surface flow enhancement devices.

In addition, since surface flow enhancement devices are easily attachable and detachable, they can be added after market, and placed wherever they are needed. And should a better location be found, they can be easily moved to new locations. In fact, it would be possible for users without access to sophisticated sensors to simply place one or more surface flow enhancement devices on their vehicle and measure whether gas mileage decreases. The user can then adjust the number and placement of the surface flow enhancement devices as desired until a most efficient configuration is determined.

The user can also adjust the shape of surface flow enhancement devices used, if multiple shapes are available. For example, if one shape is particularly effective on one part of a vehicle, and another shape is more effective on another part of the vehicle, the user can mix and match as needed. And if an improved surface flow enhancement device shape becomes available, the user can replace the surface flow enhancement devices 100 as desired.

The easy attachment and detachment of the surface flow enhancement devices also allows for easy maintenance, cleaning, replacement, and removal. The user need not fear that the surface flow enhancement devices 100 will detract from the value of the vehicle, nor inhibit a resale, nor that they will wear out and be difficult or expensive to replace.

Alternate Placement of Surface Flow Enhancement Devices

As noted above, many alternate placement positions are possible for surface flow enhancement devices. FIGS. 16 to 19 disclose several possible alternate placement schemes for an automobile embodiment.

Figure 16:
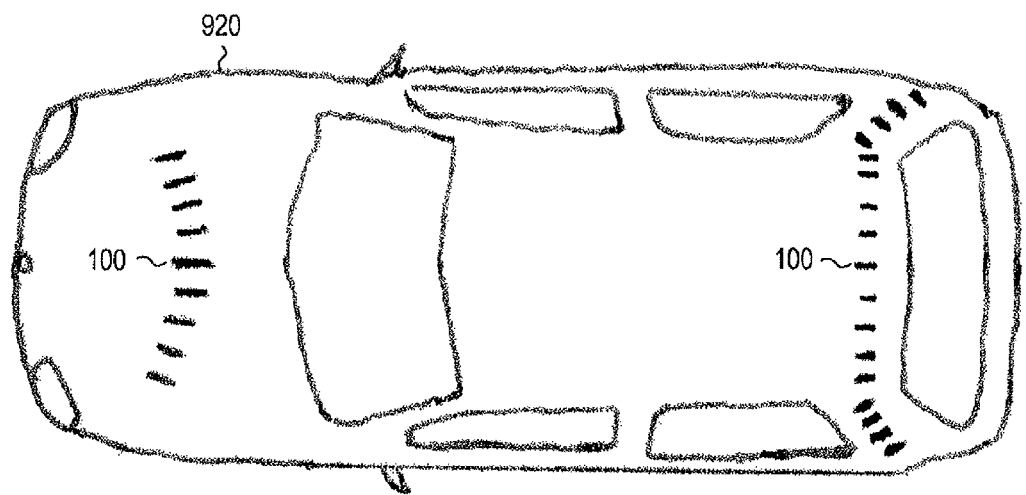
FIG. 16 is an overhead view of a vehicle showing a placement of an array of surface flow enhancement devices on a top of a vehicle, according to disclosed embodiments.

FIG. 16 is an overhead view of a vehicle showing a placement of an array of surface flow enhancement devices on a top of a vehicle, according to disclosed embodiments. As shown in FIG. 16, surface flow enhancement devices 100 can be placed on the front hood of a vehicle 920 in an arc curving away from the front of the vehicle 920. They can also be placed in a line on the rear roof and sides of the vehicle 920.

Figure 17:
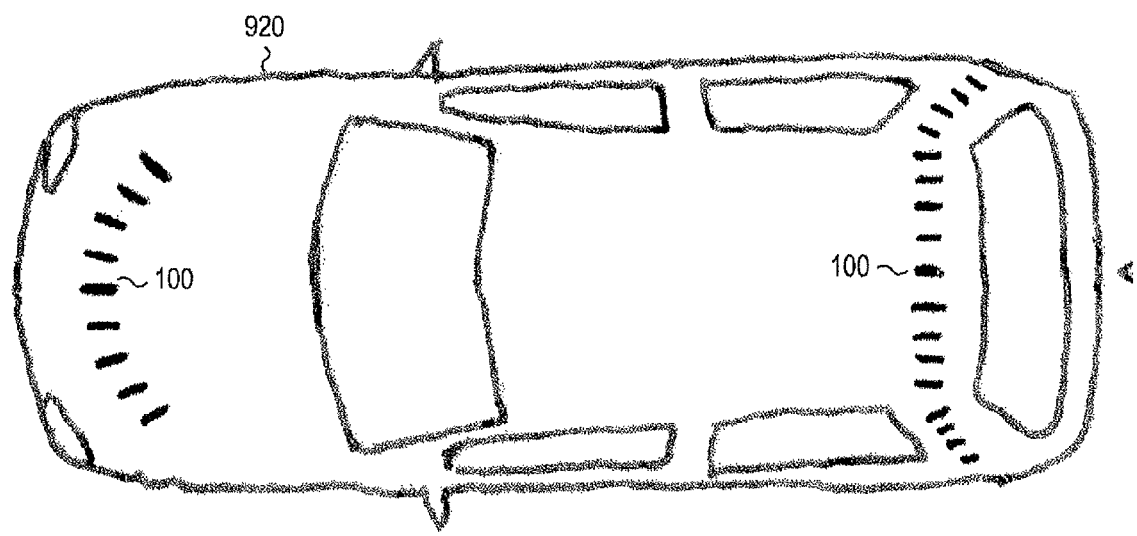
FIG. 17 is an overhead view of a vehicle showing a placement of an array of surface flow enhancement devices on a top of a vehicle, according to disclosed embodiments.

FIG. 17 is an overhead view of a vehicle showing a placement of an array of surface flow enhancement devices on a top of a vehicle, according to disclosed embodiments. As shown in FIG. 17, surface flow enhancement devices 100 can be placed on the front hood of a vehicle 920 in an arc curving toward the front of the vehicle 920. They can also be placed in a line on the rear roof and sides of the vehicle 920.

Figure 18:
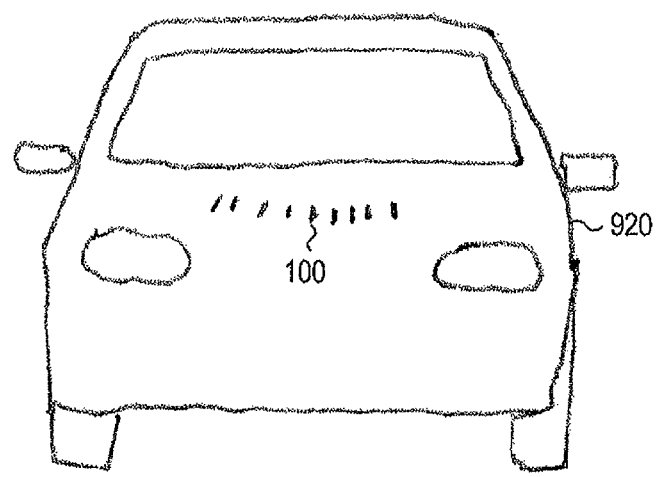
FIG. 18 is an overhead view of a vehicle showing a placement of an array of surface flow enhancement devices on a side of a vehicle, according to disclosed embodiments.

FIG. 18 is an overhead view of a vehicle showing a placement of an array of surface flow enhancement devices on a side of a vehicle, according to disclosed embodiments. As shown in FIG. 18, surface flow enhancement devices 100 can be placed on the front hood of a vehicle 920 in a line.

Figure 19:
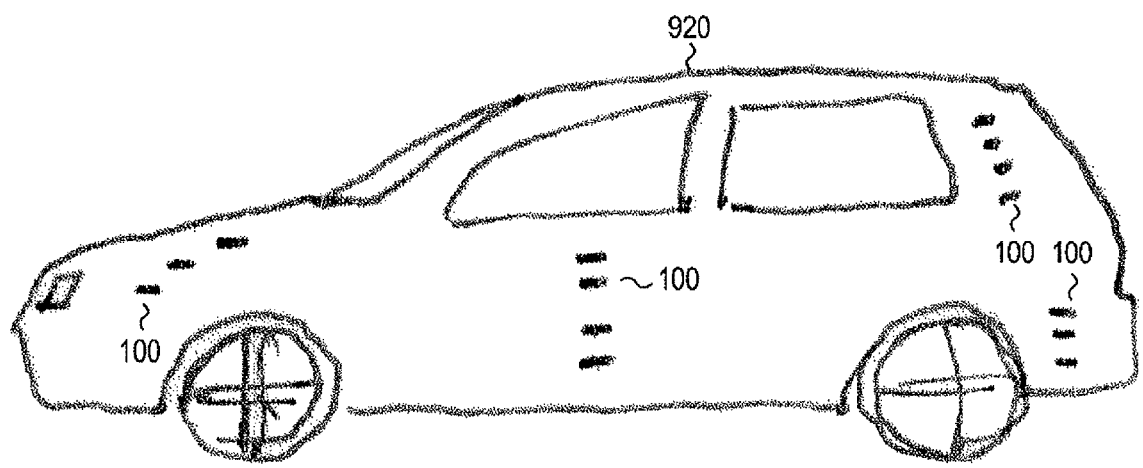
FIG. 19 is an overhead view of a vehicle showing a placement of an array of surface flow enhancement devices on a front of a vehicle, according to disclosed embodiments.

FIG. 19 is an overhead view of a vehicle showing a placement of an array of surface flow enhancement devices on a front of a vehicle, according to disclosed embodiments. As shown in FIG. 19, surface flow enhancement devices 100 can be placed in a line on the side of the of a vehicle 920, in a line on a door of the vehicle 920, or in a line on the rear side of the vehicle 920.

Various combinations of these and other arrangements can also be made. In addition, although the embodiments above all show an automobile by way of example, surface flow enhancement devices can be used on any vehicle that passes through a fluid environment. For example, they can be used on automobiles, trucks, motorcycles, airplanes, space planes, helicopters, missiles, drones, ships, boats, and submarines.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A detachable surface flow enhancement device, comprising:
    a structure configured to deflect a moving fluid incident upon the structure, the structure having a front end, trailing end and a footprint, the structure having a surface area,
    wherein the front end is wider than the trailing end, and wherein the surface area is about twice an area of the footprint; and
    an attaching element configured to attached the structure to a submerged portion of a hull of a vessel and to detach the structure from the hull of the vessel without altering the surface of the vehicle.

2. The detachable surface flow enhancement device of claim 1, wherein the attaching element does not pass through the surface of the vehicle.

3. The detachable surface flow enhancement device of claim 1, wherein the attaching element does not employ an adhesive material to attach the aerodynamic structure to the surface of the vehicle.

4. The detachable surface flow enhancement device of claim 1, wherein the surface of the vehicle is a substantially smooth surface without perforations.

5. The detachable surface flow enhancement device of claim 1, wherein the aerodynamic structure has a teardrop shape.

6. The detachable surface flow enhancement device of claim 5, wherein the teardrop shape has a length between 1 and 5 inches, and wherein the teardrop shape has a width between 0.5 and 2.5 inches.

7. The detachable surface flow enhancement device of claim 1, wherein the aerodynamic structure has one of a fin shape and an oval shape with a rear fin.

8. The detachable surface flow enhancement device of claim 1, wherein the structure is one of a plurality of like structures arranged in an array on the hull of the vessel.

9. The detachable flow enhancement device of claim 8, wherein the array of like structures is one of a linear array, a regular array, and an irregular array.

10. A surface flow enhancement device, comprising:
    a structure having a teardrop shape, the structure forming a concavity therewithin, the structure having a front end, trailing end and a footprint, the structure having a surface area;
    wherein the front end is wider than the trailing end, and wherein the surface area is about twice an area of the footprint; and
    an attachment portion having a substantially flat surface configured to attach to a hull of a vessel, wherein the teardrop shape has a length between 1 and 5 inches, and wherein the teardrop shape has a width between 0.5 and 2.5 inches,
    wherein the structure is deformable to expel a fluid from the concavity, when the footprint is placed onto the hull of the vessel, to generate an attachment force between the surface flow enhancement device and the hull.

11. The surface flow enhancement device of claim 10, wherein the structure forms a concavity.

12. The surface flow enhancement device of claim 11, wherein the attachment portion is formed at least as a peripheral portion around a lip of the concavity.

13. The surface flow enhancement device of claim 11, wherein the structure comprises a first material, and wherein the attachment portion comprises a second material softer than the first material.

14. The surface flow enhancement device of claim 13, wherein the first material comprises one of flexible polyurethane, flexible thermal plastic urethane, flexible silicone, or flexible polyvinylchloride, and wherein the second material comprises one of flexible urethane, flexible silicone, flexible polyvinylchloride.

15. The surface flow enhancement device of claim 11, further comprising: an attachment element formed in the concavity and configured to attach to the hull of the vessel.

16. The surface flow enhancement device of claim 15, wherein the attachment element includes a securing magnet configured to attach to the hull of the vessel when the hull of the vessel comprises a magnetic metal.

17. The surface flow enhancement device of claim 16, wherein the concavity formed by the structure is surrounded by a substantially coplanar lip, and wherein the attachment element does not rise to a level of the substantially coplanar lip.

18. The surface flow enhancement device of claim 16, wherein the securing magnet is a rare-earth magnet.

19. The surface flow enhancement device of claim 10, wherein the structure is one of a plurality of like structures arranged in an array on the hull of the vessel.

20. The surface flow enhancement device of claim 19, wherein the array of like structures is one of a linear array, a regular array, and an irregular array.

* * * * *